United States Patent [19]
Behar

[11] 3,929,200
[45] Dec. 30, 1975

[54] DRIVE TRANSFER GEAR ASSEMBLY FOR FOUR-WHEEL DRIVE VEHICLE

[75] Inventor: Marcel N. Behar, Southfield, Mich.
[73] Assignee: Eaton Corporation, Ohio
[22] Filed: Oct. 5, 1972
[21] Appl. No.: 295,340

[52] U.S. Cl. ............................. 180/49; 180/44 R
[51] Int. Cl.² ........................................ B60K 17/00
[58] Field of Search ........................... 180/44 R, 49

[56] References Cited
UNITED STATES PATENTS

| | | | |
|---|---|---|---|
| 1,351,084 | 8/1920 | Winther | 180/44 |
| 2,080,477 | 5/1937 | Higgins et al. | 74/310 |
| 2,228,581 | 1/1941 | Olen | 74/310 |
| 3,400,777 | 9/1968 | Hill | 180/44 R |
| 3,656,573 | 4/1972 | Holberg | 180/44 R |
| 3,679,016 | 7/1972 | Bixby | 180/44 |
| 3,763,947 | 10/1973 | Longshore | 180/44 |

Primary Examiner—Robert J. Spar
Assistant Examiner—Ross Weaver
Attorney, Agent, or Firm—Teagno & Toddy

[57] ABSTRACT

A drive transfer gear assembly for a four-wheel drive truck tractor. The tractor includes a front drive steer axle assembly, a rear drive axle assembly containing the drive transfer gear assembly, and a prime mover drivingly connected to the front and rear drive mechanisms by the drive transfer gear assembly. The front axle assembly includes a rigid axle housing having end sections and a drop center section containing a differential gear set with output gears drivingly connected to wheels pivotally journaled at the outboard ends of the rigid axle housing. The rear axle assembly includes a differential gear set with output gears drivingly connected to the rear wheels, and a drive transfer gear assembly positioned forwardly of the differential gear set. The drive transfer gear assembly includes a torque proportioning planetary gear set, an angled tooth clutch for locking the planetary gear set in response to front wheel spinout, a manual clutch for preventing differentiation of the gears in the planetary gear set, and a torque limiting clutch for preventing overtorque to the front wheel drive mechanism. The angled tooth clutch including an axially slideable annular member mounted on the input shaft of the planetary gear set and movable into clutching coaction with the sun gear of the planetary, and the manual clutch includes an annular member slideably mounted in piggyback fashion on the outer periphery of the annular member on the output shaft and movable into locking engagement with the sun gear of the planetary.

8 Claims, 5 Drawing Figures

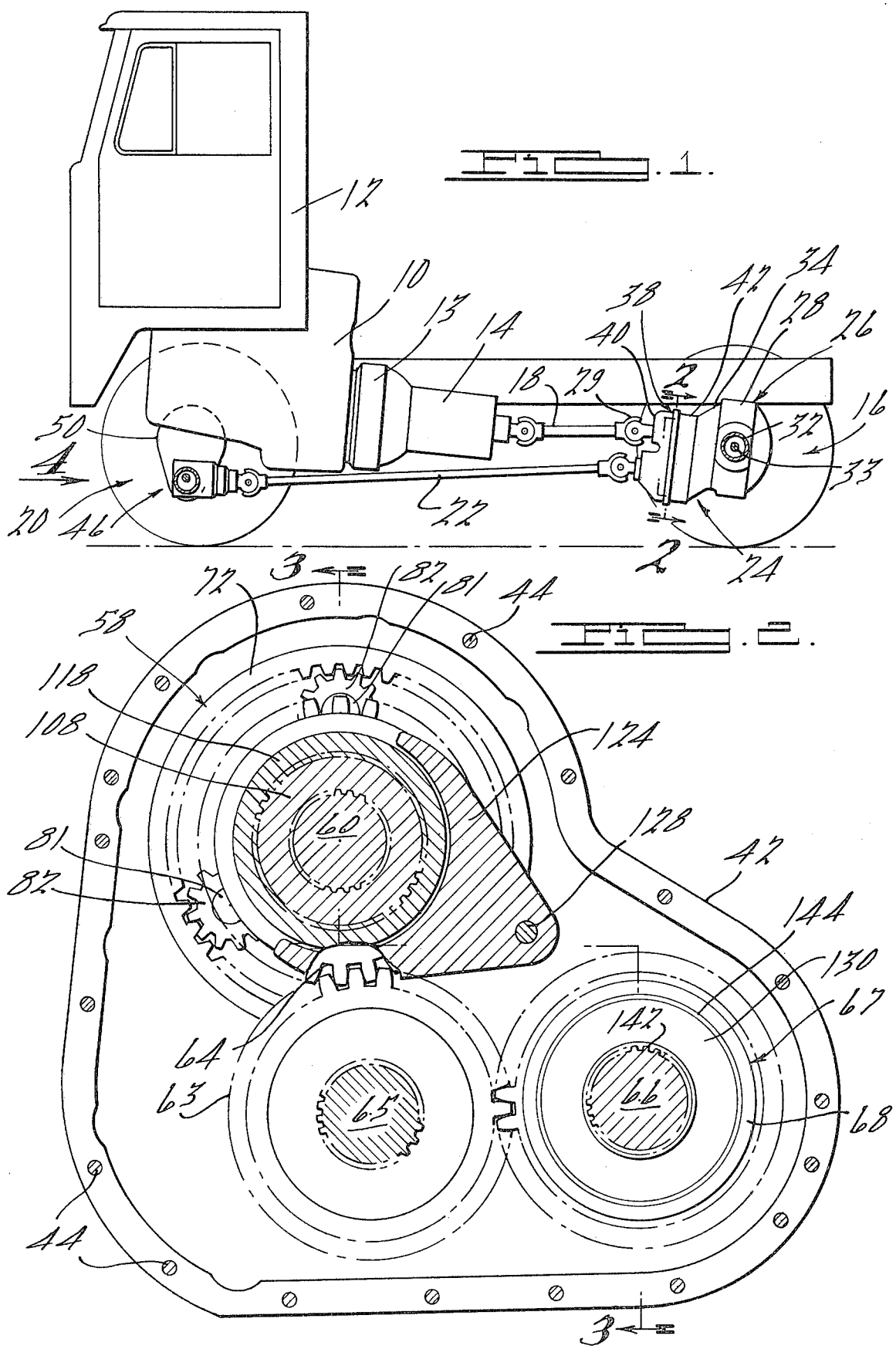

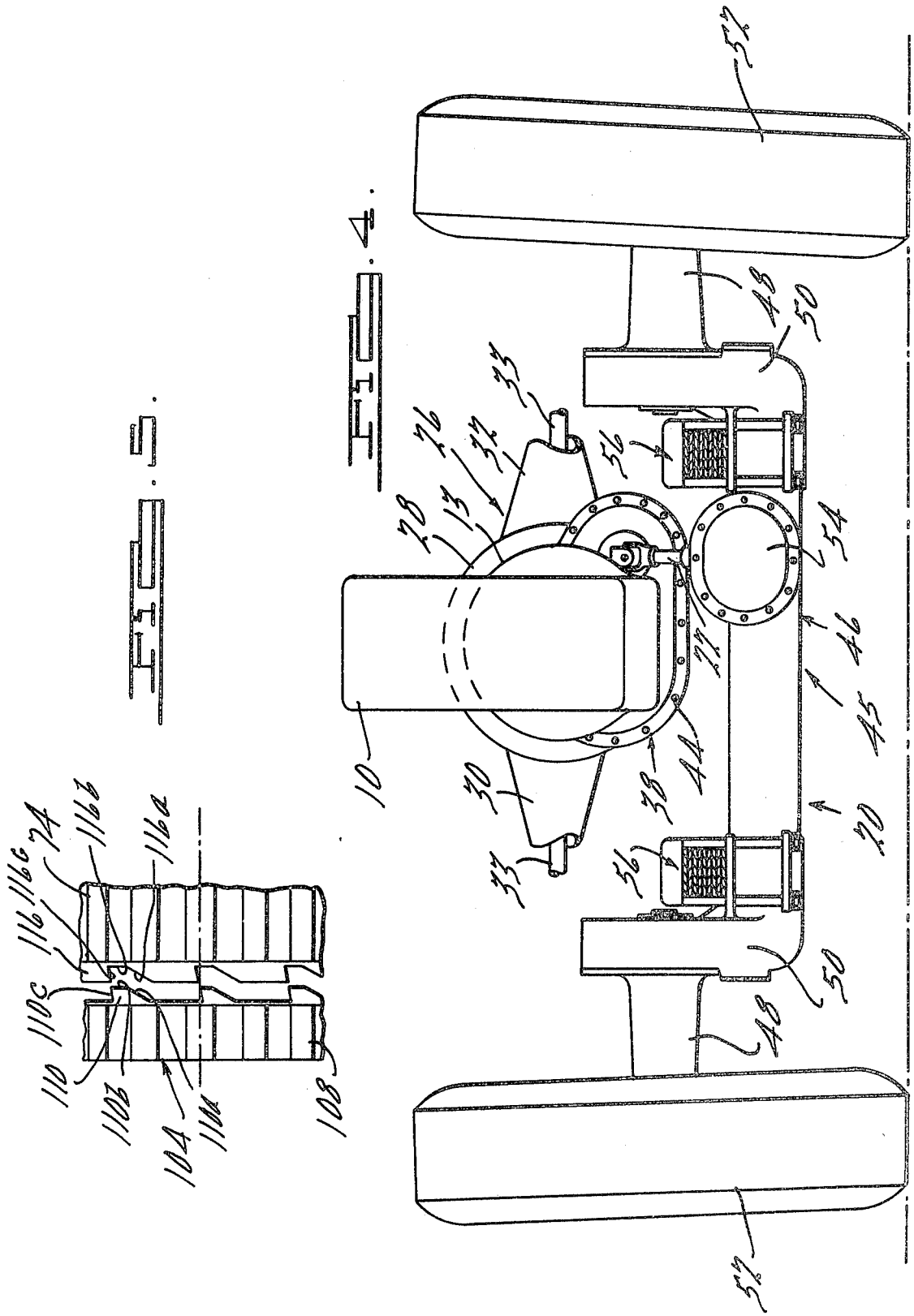

DRIVE TRANSFER GEAR ASSEMBLY FOR FOUR-WHEEL DRIVE VEHICLE

BACKGROUND OF THE INVENTION

This invention relates to four-wheel drive motor vehicles and, particularly, to four-wheel drive motor vehicles employing a drive transfer gear assembly in the drive train which functions to apportion the torque between the front and rear drive axles.

Many drive transfer gear assemblies of the torque proportioning type have been proposed heretofore. However, these prior art units have met with, at best, only limited commercial success because of several disadvantages. Specifically, these prior art units have been rather bulky and cumbersome in design, and rather expensive to manufacture. Further, the clutch assemblies, typically provided with these prior art units to selectively lock up the gear set under various operating conditions, have been of a relatively bulky and relatively expensive design and the durability of these clutch assemblies has been found to be marginal in certain duty cycles.

SUMMARY OF THE INVENTION

It is a primary object of the present invention to provide a torque proportioning drive transfer gear assembly which overcomes the noted disadvantages of the prior art units.

A more specific object is to provide a torque proportioning drive transfer gear assembly that is more durable, more efficient, and less expensive than the prior art units.

The invention drive transfer gear assembly is of the type including an input shaft adapted to be coupled to the output of the vehicle engine; a torque proportioning gear set coaxial with the rotational axis of the input shaft and having an input gear driven by the input shaft and first and second relatively rotatable output gears driven by the input gear and adapted to be drivingly connected to the front and rear drive axles, respectively; and a clutch assembly for selectively locking up the torque proportioning gear set. According to an important feature of the invention, the clutch assembly includes a first annular clutching member fixed to rotate with a first gear of the gear set but slideable axially relative to that gear and a second annular clutching member slideably splined to the exterior periphery of the first annular member; and a second gear of the gear set is provided with first and second clutch means which coact respectively with clutch means on the annular clutching members to provide, respectively, one-way clutch precluding relative rotation of the first and second gears in one directional mode while allowing such rotation in the other directional mode, and a positive lockup clutch precluding such relative rotation in either directional mode. In the disclosed embodiment, the one-way clutch is defined by coacting annular sets of angled teeth on the first annular clutching member and on the second gear, and the lockup clutch is defined by coacting annular sets of relatively straight-sided teeth on the second annular clutching member and on the second gear.

According to another feature of the invention, spring means are provided which act to continuously bias the first annular clutching member into clutching engagement with the related clutch means on the second gear, whereby to provide an automatically operating one-way clutch which locks up in response to spinout of the front wheels while allowing overrun in response to rear wheel spinout, and linkage means drivingly engage the second annular clutching member and operate in response to operator manipulation to move the second annular member axially into locking engagement with the related clutch means on the second gear, whereby to provide, in effect, a manual override for the one-way clutch.

According to another feature of the invention, the torque proportioning gear set includes a planet carrier coupled to the input shaft receiving the engine output, a ring gear coupled to the rear drive axle, a sun gear coaxial with the input shaft and coupled to the front drive axle, and a plurality of planet pinions meshingly interposed between the ring gear and the sun gear; the first annular clutching member is slideably splined on the input shaft with the sun gear disposed between the clutching member and the spider portion of the planet carrier; the second annular clutching member is slideably splined in piggyback fashion on the first annular member; and the annular sets of teeth are provided on the adjacent annular end face of the sun gear.

According to yet another feature of the invention, the planet carrier includes a hub portion fixed to the input shaft, and the sun gear is journaled on the hub portion of the planet carrier and comprises a double gear having a relatively large diameter at the end face adjacent the annular clutching members and a relatively small diameter at the other end face; the relatively large sun gear diameter at the end face adjacent the clutching means provides a large end face area for formation of the annular tooth sets and provides a relatively large diameter gear face for coupling to the front drive axle, and the relatively small diameter at the other end face allows the sun gear to stack compactly between the hub portion of the planet carrier and the planet pinions.

These and other objects, features, and advantages of the invention will be apparent from the detailed description of the preferred embodiment and from the drawings.

BRIEF DESCRIPTION OF THE DRAWINGS

In the drawings:

FIG. 1 is a somewhat schematic view of a motor vehicle embodying the torque proportioning drive transfer gear assembly of the invention;

FIG. 2 is a cross-sectional view taken on line 2—2 of FIG. 1;

FIG. 4 is a somewhat schematic, partially fragmentary view looking in the direction of the arrow 4 in FIG. 1 with the rear axle assembly raised slightly relative to the front axle assembly for purposes of clarity; and FIG. 5 is an enlarged, fragmentary view of a one-way clutch utilized in the invention gear assembly.

DESCRIPTION OF THE PREFERRED EMBODIMENT

Figure 3:
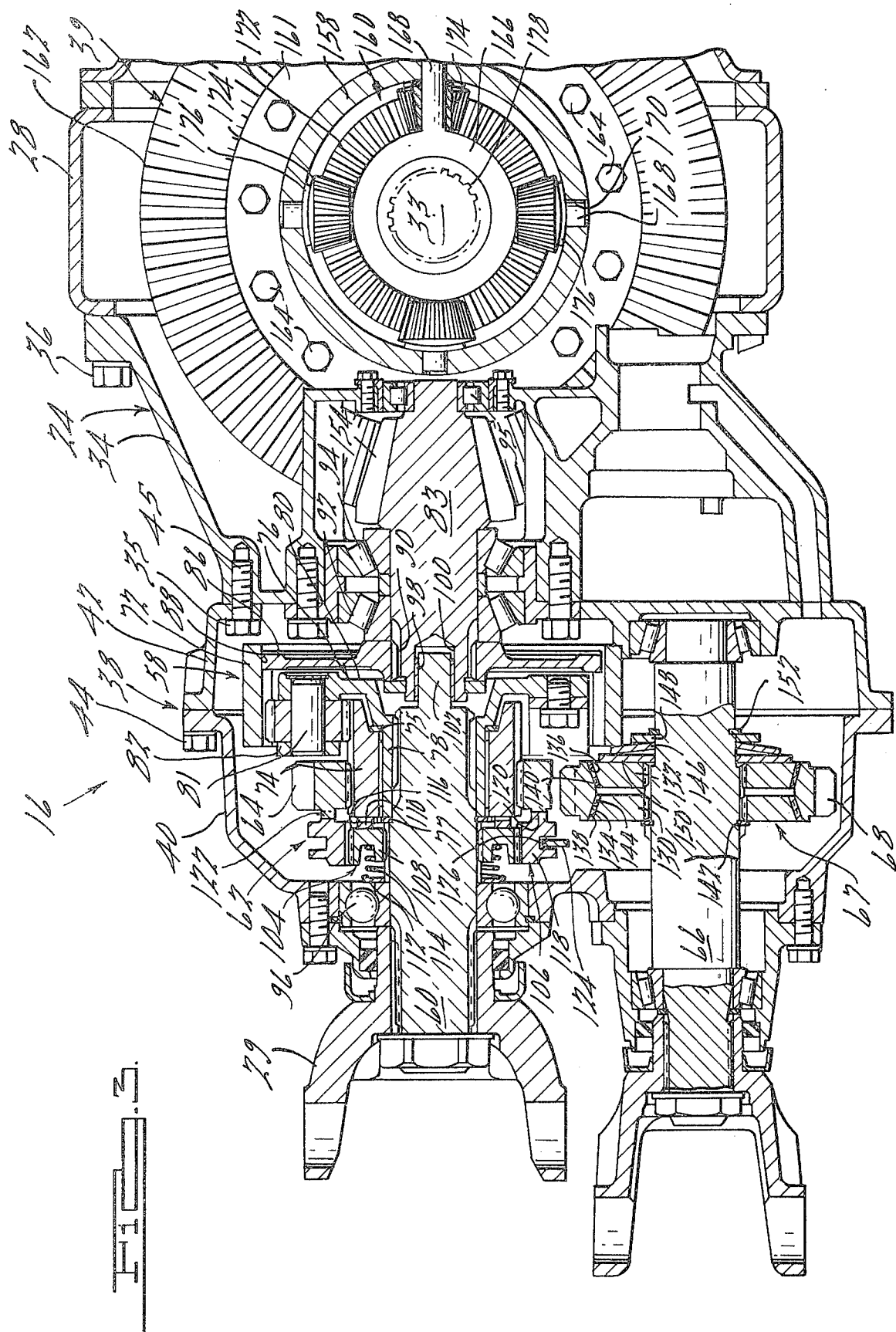
FIG. 3 is a cross-sectional view taken on line 3—3 of FIG. 2.

The motor vehicle seen in FIG. 1 is of the truck tractor type and, broadly considered, includes an engine 10, a body 12 of the cab-over-engine type, a clutch 13, a ratio change transmission 14, a rear axle assembly 16 drivingly coupled to transmission 14 by engine drive shaft 18, and a front drive axle assembly 20 drivingly coupled to rear axle assembly 16 by front drive shaft The various drive components of rear axle assembly 16 are housed in a rigid unitary housing assembly 24. Housing assembly 24, best seen in FIGS. 3 and 4, includes a rigid rear axle housing 26 having a differential banjo housing portion 28 and axle shaft housing portions 30, 32; a differential carrier housing 34 secured to banjo housing portion 28 by a plurality of bolts 36 (FIG. 3); and a drive transfer housing 38 having front and rear housing sections 40, 42 secured together by a plurality of bolts 44. Housing section 42 is secured to differential carrier housing 34 by a plurality of bolts 35. Axle shaft housing portions 30, 32 journal a pair of rear wheel drive shafts 33.

Front axle assembly 20, partially shown in FIG. 1 but best seen in FIG. 4, includes a rigid unitary housing assembly 45 having a drop center section housing 46, a pair of end section housings 48, and a pair of gear reduction housings 50. A pair of wheel assemblies 52 are pivotally secured to the outboard ends of end section housings 48. Center section housing 46 includes a low profile differential housing portion 54, containing a differential gear set (not shown) connected at its input to front drive shaft 22. A pair of suspension spring assemblies 56 are mounted on center section housing 46 to support body 12 on axle assembly 20. Further details of front axle assembly 20, including details of the housing assembly and the various drive components within the housing assembly, are disclosed in copending U.S. Pat. application Ser. No. 296,360 filed Oct. 15, 1972 and assigned to the assignee of this application.

Referring now to FIGS. 2 and 3, a drive transfer gear assembly is positioned in drive transfer housing 38 and a rear axle differential gear set 39 is positioned in differential banjo housing portion 28. The drive transfer gear assembly includes a planetary gear assembly 58 concentric to an input shaft 60; a double clutch mechanism 62 also concentric to shaft 60; an idler gear 63 in mesh with an idler drive gear 64 of the planetary gear assembly and secured to an idler shaft 65; and a front drive output shaft 66 carrying a torque limiting clutch assembly 67. An annular gear 68, formed as part of the torque limiting clutch assembly, is in mesh with and driven by idler gear 63. Input shaft 60, which is coupled to engine drive shaft 18 by universal joint 29, rotates in a counterclockwise direction, as viewed from the rear, for forward vehicle motion.

Planetary gear assembly 58, as best seen in FIG. 3, includes a planet gear assembly 70, a ring gear 72, and a sun gear 74. Planet gear assembly 70 includes a planet carrier 76 having a hub portion 78 splined to input shaft 60, a spider 80, three stub shafts 81, and three planet pinions 82 journaled on the shafts 81 and in mesh with the ring and sun gears. Ring gear 72 is connected to an output shaft 83 by a spider 86 splined at 88 to the ring gear and at 90 to output shaft 83. Output shaft 83 is journaled near its forward end by a pair of tapered roller bearings 92, 94 supported by housing portion 42, and at its rearward end by a roller bearing 95 supported by differential housing 34. Output shaft 83 is coaxial to input shaft 60; shaft 60 is journaled at its forward end in a ball bearing 96 and at its rearward end within a sleeve bearing 98. Sleeve bearing 98 is positioned in an axial pilot bore 100 in the forward end of output shaft 83 and receives a necked down pilot portion 102 on the rearward end of input shaft 60. Sun gear 74 is journaled on hub portion 78 of planet carrier 76, and is secured against axial movement relative to hub portion 78 and input shaft 60 by thrust washers 75 and 77. Idler drive gear 64 is splined to sun gear 74.

Planetary gear set 58 is designed to proportion torque between the front and rear axles in relation to a contemplated loading ratio for the axles. For the disclosed embodiment, the rear axle loading is twice the front axle loading; hence, the planetary gear set is designed to proportion approximately 64% of its output torque to rear output shaft 83 and 36% to front output shaft 66.

With continued reference to FIG. 3, double clutch assembly 62 includes an angled tooth ratchet clutch 104 and a straight tooth clutch 106. Angled tooth clutch 104 includes an annular member 108 slideably splined on input shaft 60 and having an annular set of angled teeth 110; a spring retainer 112; a helical spring 114; and a coacting annular set of angled teeth 116 formed on the adjacent annular end face of sun gear 74. The specific shapes of the annular sets of angled teeth 110 and 116 are shown in FIG. 5. Each tooth 110 includes an angled rise face 110a, a dwell face 110b, and an engaging face 110c undercut somewhat with respect to the rotational axis of member 108. Each tooth 116 includes an angled rise face 116a, a dwell face 116b, and an engaging face 116c undercut somewhat with respect to the rotational axis of member 108. With reference again to FIG. 3, straight tooth clutch 106 includes an annular member 118 slideably splined on the outer periphery of annular member 108 and having an annular set of straight teeth 120; a coacting annular set of straight teeth 122 formed on the adjacent annular end face of idler drive gear 64, and a shift fork 124 loosely received in an annular groove 126 in member 118. Shift fork 124, as best seen in FIG. 2, includes a push rod 128 to effect axial movement of annular member 118. Push rod 128 may be controlled by the vehicle operator in the vehicle cab in any of several well known manners, viz a remotely controlled air motor or solenoid valve mounted on the transfer housing or a push-pull linkage system.

Torque limiting clutch 67 is a double cone clutch and, as best seen in FIG. 3, includes a pair of annular members 130, 132 slideably splined to output shaft 66 and defining on their outer periphery frusto-conical surfaces 134, 136 which mate with a pair of frusto-conical surfaces 138, 140 defined on the inner periphery of annular gear 68. A snap ring 142 prevents forward axial movement of member 130 along shaft 66. Conical surfaces 134, 136 have bonded thereto a suitable lining material 144 selected for its frictional, wear, and load bearing properties, such as Raybestos-Manhattan frictional material Number X-16987. Lining material 144 is biased into frictional engagement with conical surfaces 138, 140 by a disc spring 146 which bears against a spacer 148 at its rearward side and a hardened thrust plate 150 at its forward side. Spacer 148 is retained against rearward axial movement along output shaft 66 by a snap ring 152.

A beveled pinion 154 is formed on the rearward end of output shaft 83. The axis of pinion 154, which is coaxial with the axes of input shaft 60 and output shaft 83, intersects the rotational axis of differential gear set 39. Differential gear set 39 is supported within differential banjo housing portion 28 by differential carrier housing 134 in a well known manner (not shown). Differential gear set 38 includes a differential case or carrier 158 housing a differential gear train 160; case 158 has a radially extending flange 161 to which a beveled ring gear 162 is secured by a plurality of bolts 164. Ring gear 162 is in mesh with pinion 154. Differential gear train 160 includes a spider 166 having four radially extending shafts 168 which are held at their outer ends within four bores 170 in case 158; a pair of beveled side gears 172 (one of which is shown); four beveled side pinions 174 journaled on shaft 168; and four side pinion thrust washers 176 interposed between the side pinions and case 158. Side gears 172 are splined to the rear wheel drive shafts 33 in a conventional manner as shown at 178.

What is claimed is:

1. A torque proportioning drive transfer gear assembly for a motor vehicle of the type including a first drive axle, a second drive axle, and an engine; said assembly comprising:
   A. an input shaft adapted to be coupled to the output of said engine;
   B. torque proportioning gear means coaxial with the rotational axis of said input shaft and having an input gear driven by said input shaft and first and second relatively rotatable output gears driven by said input gear and adapted to be drivingly connected to said first and second axles, respectively;
   C. a first annular member fixed to rotate with one of said gears but slideable axially relative to said one gear;
   D. clutch means on said first annular member;
   E. a second annular member mounted on the exterior periphery of said first annular member for rotation therewith but axially slideable relative thereto;
   F. clutch means on said second annular member;
   G. first clutch means on another of said gears operative in response to axial movement of one of said annular members to coact with the clutch means on said one annular member to preclude relative rotation between said one gear and said other gear in one directional mode while allowing relative rotation in the other directional mode; and
   H. second clutch means on said other gear adapted in response to axial movement of the other annular member to coact with the clutch means on the other annular member to preclude relative rotation between said one gear and said other gear in either directional mode.

2. A drive transfer gear assembly according to claim 1 wherein:
   I. said first annular member is said one annular member; and
   J. said second annular member is said other annular member.

3. A drive transfer gear assembly according to claim 1 wherein:
   I. said first clutch means and the clutch means on said one annular member comprise coacting annular sets of angled teeth adapted to lockingly engage during such relative rotation in said one directional mode and slip freely during such relative rotation in said other directional mode.

4. A drive transfer gear assembly according to claim 3 wherein:
   J. said second clutch means and the clutch means on the other annular member comprise coacting annular sets of relatively straight-sided teeth adapted to lockingly engage in either directional mode of such relative rotation.

5. A drive transfer gear assembly according to claim 4 and further including
   K. means continuously biasing said one annular member into clutching engagement with said first clutch means; and
   L. linkage means drivingly engaging said other annular member and accessible to an operator of said vehicle and operative in response to operator manipulation to move said other annular member axially along said one annular member into locking engagement with said second clutch means.

6. A torque proportioning drive transfer gear assembly for a motor vehicle of the type including a first drive axle, a second drive axle, and an engine; said assembly comprising:
   A. an input shaft adapted to be coupled to the output of said engine;
   B. a planetary torque proportioning gear set comprising
      (1) a planet carrier coupled to said input shaft and having a spider portion,
      (2) a ring gear concentric with the rotational axis of said input shaft and coupled to said first axle,
      (3) a sun gear concentric with said input shaft and coupled to said second axle, and
      (4) a plurality of planet pinions carried by said planet carrier and meshingly interposed between said ring gear and said sun gear;
   C. a first annular member fixed to said input shaft but slideable axially therealong at a location thereon adjacent the annular end face of said sun gear remote the spider portion of said planet carrier;
   D. coacting annular sets of angled teeth formed on said sun gear annular end face and on the annular end face of said annular member adjacent said sun gear face;
   E. a second annular member mounted on the exterior periphery of said first annular member and slideable axially therealong;
   F. coacting annular sets of relatively straight-sided teeth formed on the annular end face of said second annular member adjacent said sun gear face and on said sun gear face radially outwardly of the angled tooth set formed thereon;
   G. means continuously biasing said first annular member axially toward said sun gear to lockingly engage said input shaft and sun gear in one directional mode of relative rotation and allow slippage therebetween in the other directional mode of relative rotation; and
   H. linkage means drivingly engaging said second annular member and accessible to an operator of said vehicle and operative in response to operator manipulation to move said second annular member axially along said first annular member into locking engagement with said sun gear.

7. A drive transfer gear assembly according to claim 6 wherein:
   I. said planet carrier includes an axially extending hub portion fixed to said input shaft;
   J. said sun gear is journaled on said hub portion and comprises a double gear having
      (1) a relatively large diameter at said remote end face, whereby to provide a large area for formation of said angled and straightsided tooth sets and provide a relatively large diameter gear face for coupling to said second axles, and (2) a relatively small diameter at the other end face, whereby to stack compactly between said hub portion and said planet pinions.

8. A torque proportioning drive transfer assembly for a four-wheel drive motor vehicle of the type including a drive rear axle, a drive front axle, an engine disposed forwardly of the vehicle, an engine drive shaft, and a front axle drive shaft, said transfer assembly comprising:

A. a planetary gear set including an input shaft journaled on an axis generally parallel to the longitudinal vehicle axis and adapted to be drivingly connected to the engine drive shaft, a ring gear adapted to be drivingly connected to the rear axle, a sun gear journaled on said input shaft, and a planet carrier coupled to said input shaft and carrying planet pinions meshingly interposed between said ring gear and said sun gear;

B. an output shaft journaled on an axis parallel to but disposed laterally of and below the axis of said input shaft and below the rotational axis of said drive rear axle;

C. an output gear on said output shaft; and

D. an idler gear disposed generally below and in meshing engagement with said sun gear and generally laterally of and in meshing engagement with said output gear.

* * * * *